Sept. 9, 1958     C. F. JAGSCH     2,851,301
COMBINATION PALLET RACK AND TRUCK BODY
Filed Oct. 9, 1957     2 Sheets-Sheet 1
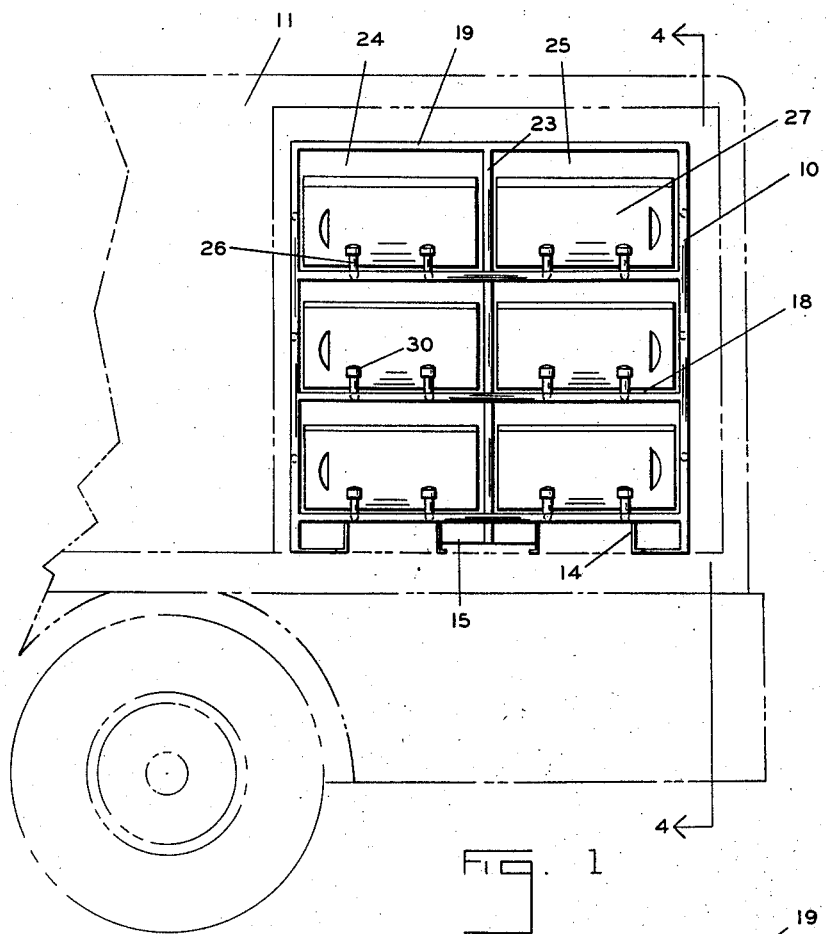
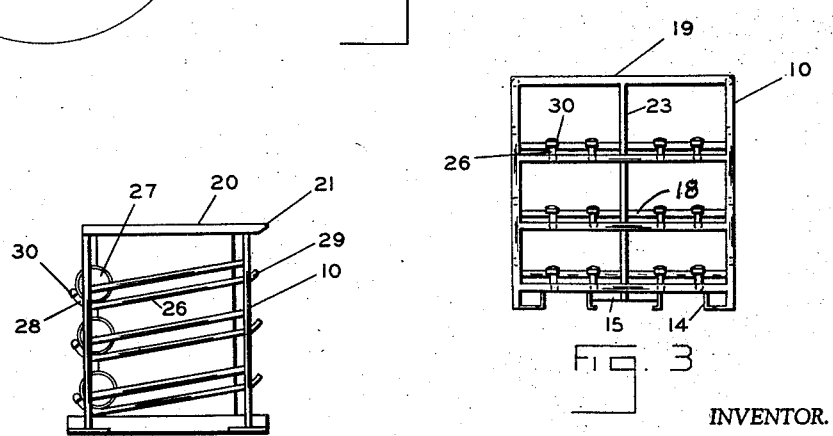
INVENTOR.
CARL F. JAGSCH
BY CORBETT, MAHONEY, MILLER & RAMBO
ATT'YS.

Sept. 9, 1958 C. F. JAGSCH 2,851,301
COMBINATION PALLET RACK AND TRUCK BODY
Filed Oct. 9, 1957 2 Sheets-Sheet 2
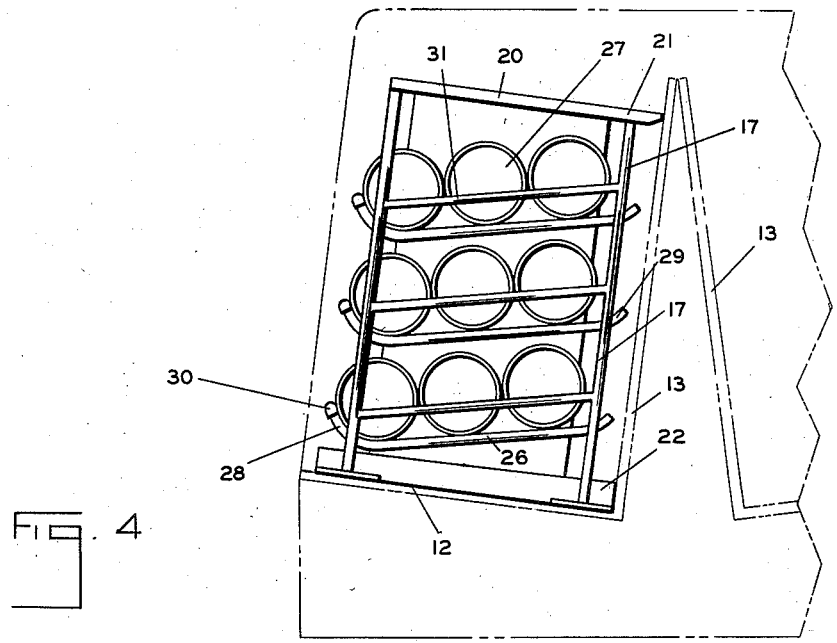
Fig. 4
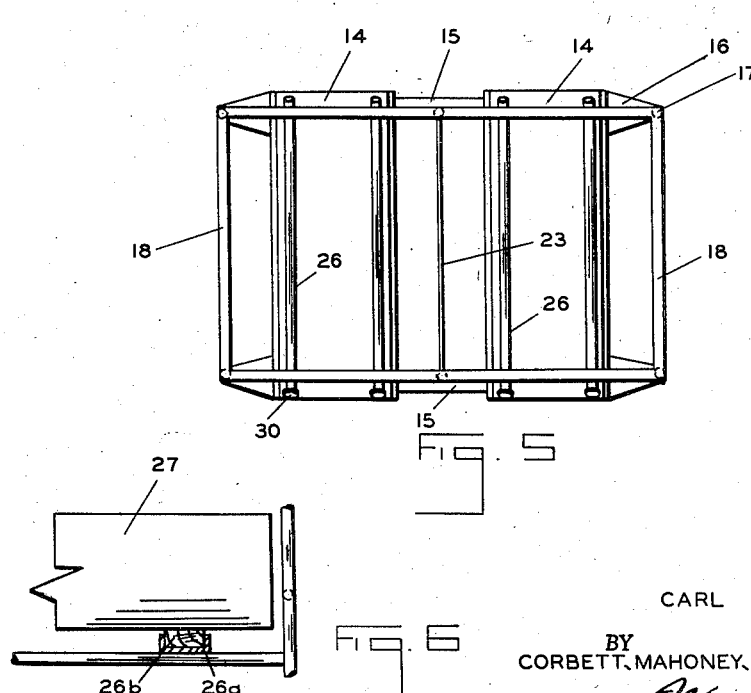
Fig. 5
Fig. 6
INVENTOR.
CARL F. JAGSCH
BY
CORBETT, MAHONEY, MILLER & RAMBO
BY Wm. V. Miller
ATTYS.

United States Patent Office 2,851,301
Patented Sept. 9, 1958

2,851,301

COMBINATION PALLET RACK AND TRUCK BODY

Carl F. Jagsch, Columbus, Ohio, assignor to Timmons Metal Products Co., Columbus, Ohio, a corporation of Ohio Application October 9, 1957, Serial No. 689,169

8 Claims. (Cl. 296—3)

My invention relates to a combination pallet rack and truck body. It has to do, more specifically, with a rack for carrying containers which is formed on a pallet adapted to be loaded on a truck body, the pallet rack and truck body being designed for cooperation in a novel manner.

The present invention will be described in connection with the palletizing and loading of cylindrical containers or tanks on a truck, for example, tanks for syrup used in the making of carbonated beverages or tanks of premixed carbonated beverages and which are delivered by the truck. The loading and unloading of beverage delivery trucks with cases of bottles has been palletized to a great extent in the last few years and it is desirable that a palletized system also be used for loading and unloading tanks of the type indicated and that this system be applicable to trucks of the type now used for delivery of beverage in cases. However, the loading must be accomplished in such a manner that although the tanks are effectively retained in position on the pallet rack loaded on the truck body, they are readily accessible for removal therefrom.

According to my invention, the containers are supported on racks carried by pallets which can be handled by fork-lift trucks. Each rack includes supporting rails in tiers, the rails of each tier being inclined so that when a cylindrical tank is disposed thereon with its axis transversely at one end of the tier, it will roll to the other end thereof. The pallet rack is designed to be disposed on a truck which has a deck that is inclined inwardly and downwardly and the inclination of each tier of the rack is such that when the pallet rack is placed on the deck in the proper relationship thereto, the rails of the tiers of the rack are inclined outwardly slightly so that the successive tanks thereon will roll to the outer side of the rack to facilitate unloading from the truck during delivery. Thus, as each outermost tank is removed, the next will roll into the vacated position. To accomplish this, the inclination of the rails of each tier of the rack is greater than that of the truck deck and the pallet rack is positioned thereon with the rack rail angle reversed relative to the truck deck angle.

The accompanying drawings illustrate one example of this invention but it is to be understood that the principles of this invention are capable of other applications. In these drawings:

Figure 1 is a side elevational view of a truck body showing the pallet rack for holding the containers positioned thereon.

Figure 2 is a side elevational view of the pallet rack of this invention.

Figure 3 is a front view of the pallet rack.

Figure 4 is a transverse vertical sectional view through the truck body taken substantially along line 4—4 of Figure 1 and showing the pallet rack positioned thereon.

Figure 5 is a plan view of the pallet rack.

Figure 6 is an enlarged transverse fragmentary sectional view showing a modification of the pallet rack.

With reference to the drawings, I have illustrated in Figure 1 a pallet rack 10 mounted on a truck body 11. The truck body 11 may be of any suitable type and arranged as desired for pallet loading except that in accordance with this invention, it will be provided with an inwardly and downwardly inclined deck 12 upon which the pallet rack 10 will rest. Inwardly inclined decks 12 may be provided at each side of the truck with a stop wall 13 being provided at the inner edge of each deck 12. Each wall 13 is perpendicular to the deck 12 associated therewith and the two walls 13 converge to form a middle partition extending along the center line of the truck body. Thus, outwardly opening spaces are provided at each side of the truck for receiving the pallet racks 10.

Each pallet rack 10 comprises a flat base formed mainly of two inverted parallel channels 14 which are relatively wide. These channels extend forwardly and rearwardly and are spaced properly laterally from each other and in parallel relationship to receive the forks of a forklift truck. The channels 14 are joined rigidly together by connecting cross members 15 at the front and back which are suitably welded to the flanges of the channels. At the front and rear outer corners of each channel 14 there is welded an outwardly extending lug 16 which supports a vertical post 17. Connecting these posts 17 at both the front and rear are the transversely extending vertically spaced braces 18 and the top rail 19 which all have their ends welded to the posts 17. At the sides of the rack, the posts 17 are connected together at their upper ends by the rails 20 which are welded to the posts. It will be noted that the upper rails 20 have rearwardly extending stop portions 21 which project beyond the posts 17. The rear ends of the channels 14 similarly project beyond the posts 17 to provide the stop portions 22 at the lower end of the rack. Midway between the sides of the rack there is provided a vertical partition plate 23 which is vertically disposed and runs from the top to bottom and from front to rear of the rack, being suitably secured to the lower cross members 15, the top rails 19, and all the cross braces 18. Thus, this partition 23 divides the rack into two separate columns or sections 24 and 25 which are provided with the vertically spaced tiers of rails 26 for supporting the cylindrical tanks 27.

Each tier of rails 26 comprises a pair of the rails which are disposed in laterally spaced parallel relationship and extend from front to rear of the rack. It will be noted that the rear cross braces 18 are disposed at different levels than the forward cross braces 18, the ones at the rear being higher than the cooperating ones at the front. The rails 26 are shown, in one example, as being of tubular form having the upturned forward ends 28 and the upturned rear ends 29, both of which serve as stops for the tanks supported on the tier formed by each pair of cooperating rails. The upturned ends of these tubes may receive rubber cups 30 or other similar protective devices. Thus, the pair of rails forming each tier will support the tanks 27 thereon with their axes disposed transversely of the rails. The inner partition 26 will limit inward axial movement of the tanks 27 of each column of tiers. To prevent outward movement of the tanks in each column, at each side of the rack there are provided the stop bars 31 which are disposed at the same inclination as the rails 26 but are spaced vertically therefrom, being parallel to the plane of the cooperating rails 26. Thus, each stop bar 31, associated with each tier of rails 26, will prevent outward axial movement of the tanks 27 supported on that tier by contacting with the associated ends of the tanks.

The racks 10 will be loaded from the rear side thereof and, as indicated in Figure 2, the tanks 27 will roll towards the other side, the first tank on the tier contacting with the forward stop ends 28 of the rails 26. Successive tanks will back up and fill the tier. At this time, the rearwardmost tank will be adjacent the rear stop ends 29 of the rails. However, it will be noted that these rear stop ends 29 are not turned upwardly as abruptly as the forward stop ends 28.

The loaded pallet rack may now be placed on the truck body 11 by means of a fork-lift truck, the forks of which will be inserted in the channels 14 of the flat base. The pallet rack will be positioned on the deck 12 of the truck with the rear stop portions 21 and 22 thereof contacting the associated inner partition wall 13 of the truck body, as shown in Figure 4. It will be noted that the upturned rear stop ends 29 of the guide rails 26 will project beyond the posts 17 but that the stop portions 21 and 22 will project a greater distance and will, therefore, prevent contact of the rail ends 29 with the wall 13. It will further be noted that the angle of inclination of the rack guide rails 26 is reversed relative to the angle of inclination of the deck 12 and that this inclination is greater than that of the deck so that with the pallet rack supported on the angled deck 12 as indicated, the rails 26 will still incline outwardly and downwardly. The result is that the tanks 27 in each tier will automatically and successively feed outwardly into contact with the upturned forward stop ends 28 of the rails 26 where they can be easily removed for delivery.

The rack is preferably made entirely of metal and the tanks 27 are usually of metal. If the tanks and the rails are of similar metal, direct contact therebetween is satisfactory and there will be no electrolytic action. However, if the tank and rack are of different metals, for example one of aluminum and the other of steel, it is desirable to prevent direct contact of these two metals. In such a case, the arrangement shown in Figure 6 may be employed where the rails 26a are made of upwardly facing channels and these channels are provided with strips of wood 26b or other non-metallic material which will project upwardly beyond the flanges of the channel and will serve as the contact surface for engaging the tanks 27.

It will be apparent from the above description that I provide a pallet supported rack which can be handled by a fork-lift truck. This rack has the inclined rails, each pair of which will support a row of containers. The rails are so inclined that the tanks will feed towards stops at one side thereof. This inclination is such that it is the reverse of the inclination of the truck deck on which the rack is to be supported and is in a greater degree so that the containers will still roll outwardly when the pallet rack is supported by the truck. The containers on each tier will sucessively roll outwardly. It will be noted that the pallet racks have flat bases and flat tops so that they may be stacked for use in storing the tanks.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. In combination, a truck body and a pallet rack supported thereby, said truck body having an inwardly and downwardly inclined deck, said pallet rack having a support in an inclined plane for a plurality of containers which will roll along the support, said support being inclined in a plane reversely relative to the inclined deck of the truck and to a greater extent so that the containers will roll outwardly on the support.

2. In combination, a truck body and a pallet rack supported thereby, said truck body having an inwardly and downwardly inclined deck, said pallet rack having a horizontal base and a frame supported thereby, said frame including laterally spaced guide rails for supporting cylindrical containers with their axes transversely thereof, said rails being disposed in an inclined plane so that the containers will tend to roll thereon to one side of the rack, the plane of inclination of the guide rails being reversed relative to the inclination of the truck body deck and being at a greater degree so that the containers will tend to roll outwardly on the rails to the outer side of the rack.

3. In combination, a truck body and a pallet rack supported thereby, said truck body having an inwardly and downwardly inclined deck on which the rack rests, said pallet rack having a horizontal base and a frame supported thereby, said frame including a plurality of supporting tiers for the containers, each of said tiers comprising laterally spaced guide rails for supporting the cylindrical containers with their axes transversely thereof, each of said tiers being disposed in an inclined plane so that the containers will tend to roll thereon to one side of the rack, the plane of inclination of the guide rails of each tier being reversed relative to the inclination of the truck body deck and being at a greater degree so that the containers will tend to roll outwardly on the rails to the outer side of the rack.

4. The combination of claim 2 in which container-engaging stops are provided at each end of each rail.

5. The combination of claim 4 in which the deck of the truck body has an upstanding wall at its inner edge perpendicular to the deck, and stop portions carried by the rack and engaging said wall.

6. A pallet rack for positioning on the inwardly and downwardly inclined deck of a truck or the like, said rack comprising a flat base and container supports inclined relative to the base so that containers positioned thereon with their axes transversely thereof will roll towards one side of the rack, the inclination of the support being reversed relative to the inclination of the deck of the truck and being at a greater degree so that when the rack is positioned on said deck the containers supported on said support will tend to roll outwardly.

7. A pallet rack according to claim 6 including a container-engaging stop at the lower ends of said container support.

8. A pallet rack according to claim 6 including a container-engaging stop at the opposite end of the support.

References Cited in the file of this patent

UNITED STATES PATENTS

| | | |
|---|---|---|
| 2,322,748 | Shaw et al. | June 29, 1943 |
| 2,685,398 | King | Aug. 3, 1954 |
| 2,707,573 | Balwics | May 3, 1955 |